United States Patent [19]

Perry

[11] Patent Number: 4,686,700
[45] Date of Patent: Aug. 11, 1987

[54] TELEPHONE OFF-HOOK DETECTOR CIRCUIT

[75] Inventor: Steven B. Perry, Highlands, N.J.
[73] Assignee: Keptel, Inc., Ocean, N.J.
[21] Appl. No.: 922,685
[22] Filed: Oct. 24, 1986
[51] Int. Cl.[4] .................. H04M 13/00; H04M 3/22
[52] U.S. Cl. .................... 379/183; 379/27; 379/377; 379/182; 379/382
[58] Field of Search ............. 379/177, 178, 127, 182, 379/183, 377, 379, 380, 382, 385, 98, 93, 27

[56] References Cited

U.S. PATENT DOCUMENTS

| | | | |
|---|---|---|---|
| 3,321,583 | 5/1967 | Maul | 379/382 |
| 3,730,999 | 5/1973 | Shaffer | 379/382 |
| 3,798,384 | 5/1974 | Shaffer | 379/382 |
| 4,054,942 | 10/1977 | Chambers, Jr. | 379/183 |
| 4,079,205 | 5/1978 | Glenn | 379/183 |
| 4,326,104 | 4/1982 | Bergida | 379/377 |
| 4,446,338 | 5/1984 | Rosch | 379/385 |

Primary Examiner—Gene Z. Rubinson
Assistant Examiner—Lawrence Fess
Attorney, Agent, or Firm—Kenyon & Kenyon

[57] ABSTRACT

A circuit for connection into a telephone line for detecting when a telephone instrument has gone off-hook and which is unaffected by the presence of a ringing signal on the telephone line. The circuit comprises a transistor switch, a first plurality of series connected diodes connected in series with the telephone line for developing a first voltage thereacross when the telephone instrument has gone off-hook, an RC circuit coupled to the first plurality of diodes for charging to the first voltage when the telephone instrument has gone off-hook after a time delay and for activating the switch, a second plurality of series connected diodes, the second plurality being greater than the first plurality, the second plurality of diodes being connected to the switch and to the first plurality of diodes for developing a second voltage thereacross during one half cycle of a ringing signal on the telephone line. The first plurality of diodes develops the first voltage during a second half cycle of the ringing signal on the telephone line. The first and second voltages are of opposite polarity, such that the charging circuit alternately charges toward the first and second voltages during a ringing signal. The charging circuit has a time constant such that it never charges to a voltage during a half cycle of the ringing signal sufficient to activate the switch and on the average, the charging circuit maintains the control input of the switch substantially intermediate the first and second voltages.

6 Claims, 1 Drawing Figure

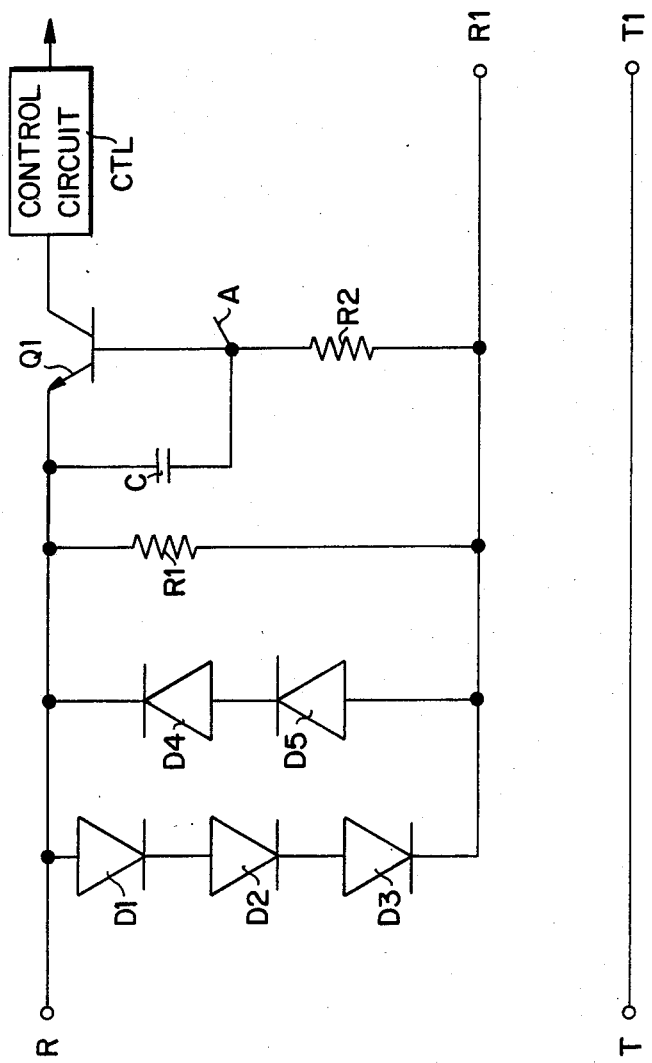

4,686,700

TELEPHONE OFF-HOOK DETECTOR CIRCUIT

BACKGROUND OF THE INVENTION

The present invention relates to direct current detection circuits, and in particular to an off-hook detector circuit for a telephone line.

With telephone equipment, it is frequently necessary to determine when the telephone has been taken off-hook. For example, in a party telephone line, it may be necessary to provide an automatic number identifying mark on the telephone line when a particular telephone instrument has gone off-hook so that the particular party on the party line may be properly identified at the telephone central office for billing purposes.

At the same time, it is important that an off-hook detector circuit for use with telephone equipment not be affected by other signals on the telephone line, for example ringing and noise signals.

SUMMARY OF THE INVENTION

Accordingly, it is an object of the present invention to provide an off-hook detector circuit for telephone equipment.

It is furthermore of an object of the present invention to provide such an off-hook detector circuit which is unaffected by ringing signals present on the telephone line.

It is furthermore yet still another object of the present invention to provide an off-hook detector circuit which is reliable and relatively noise in sensitive.

The above and other objects of the present invention are achieved by an off-hook detector circuit for use with telephone equipment comprising switching means connected to the telephone line having a control input, first means coupled to the telephone line and the switching means for developing a first voltage thereacross when the telephone instrument has gone off-hook, means coupled to the first means for charging substantially to the first voltage when the telephone instrument has gone off-hook after a time delay and for activating the switching means, second means coupled to the telephone line, the switching means, and the first means for developing a second voltage thereacross during one-half cycle of a ringing signal on the telephone line, the first means developing the first voltage during a second half-cycle of the ringing signal, the first and second voltages being of opposite polarity, whereby the charging means alternately charges toward the first and second voltages during the ringing signal, the charging means having a time constant such that the charging means never charges to a voltage during a half-cycle of the ringing signal sufficient to activate the switching means and on the average, the charging means maintains the control input of the switching means at a potential substantially intermediate the first and second voltages.

Other objects, features and advantages of the present invention will be apparent from the detailed description which follows.

BRIEF DESCRIPTION OF THE DRAWINGS

The invention will be described in greater detail in the following detailed description with reference to the single drawing FIGURE which is a schematic diagram of the off-hook detector circuit according to the invention.

DETAILED DESCRIPTION

With reference now to the drawings, the single drawing FIGURE shows the off-hook detector circuit of the present invention. The incoming ring and tip telephone lines (R and T) from the central office are connected to the circuit as shown. The off-hook detector circuit may be connected into either the ring or the tip line, with appropriate biasing or connection of the circuit elements, for example the diodes and transistor. In the illustrated embodiment, the ring line is connected to a first group of diodes comprising diodes D1, D2 and D3 and a second numerically smaller group of diodes D4 and D5 connected antiparallel to the first group. A resistor R1 is connected across both groupings of diodes. A transistor Q1 is connected as shown, with its base coupled to its emitter via a capacitor C. A resistor R2 connects the base of the transistor Q1 to the customer ring line R1.

The output of the transistor Q1 is connected to a control circuit identified as CTL. For example, the control circuit might be an automatic number identifying (ANI) circuit which places an identifying mark on the telephone lines for identifying the particular party which went off-hook.

The circuit operates as follows. When a party goes off-hook, a circuit path for DC is made between T1 and R1 via the telephone equipment which has gone off-hook. Assume that line T is positive with respect to line R because of the connection of the positive terminal of the central office talk battery voltage to line T. Accordingly, a current flows through diodes D4 and D5. A voltage drop across diodes D4 and D5 equivalent to two diode voltage drops, approximately 1.4 volts, is thus developed. Accordingly, capacitor C charges to approximately 1.4 volts via resistor R2. This will be sufficient, after a time delay, to bias transistor Q1 on, thus activating the control circuit CTL. If CTL is on ANI circuit, an identifying mark is then placed on the telephone line, thus identifying the calling party at the central office for billing purposes.

As explained previously, it is important that the off-hook detector circuit not be activated by ringing signals present on the line. Accordingly, in order to prevent ringing signals from activating the off-hook detector circuit, diodes D1, D2 and D3 are employed. When a ringing signal is present on the ring and tip lines, diodes D1, D2 and D3 will pass one half cycle of the ringing signal and diodes D4 and D5 will pass the other half cycle. Accordingly, alternating voltage drops will be developed across the grouping of diodes, D1, D2, D3 and D4, D5. For the half cycle passed by diodes D1, D2 and D3, a greater voltage drop will be developed because three diodes are employed as opposed to the two diodes for grouping D4, D5. Accordingly, diodes D1, D2 and D3 will clamp the ringing signal voltage developed across them to approximately 2.1 volts. Diodes D4 and D5 will clamp the ringing signal voltage developed across them to 1.4 volts. Thus, during a ringing signal, for one half cycle of the ringing signal, the lower leg of capacitor C, point A, attempts to charge to approximately 2.1 volts below the emitter of transistor Q1 and during the other half-cycle, point A attempts to charge to 1.4 volts above the emitter of transistor Q1. Capacitor C and resistor R2 are sized so that the RC time delay is sufficiently great so that during a ringing signal half-cycle, capacitor C does not sufficiently charge such that transistor Q1 can be turned on. However, when the telephone instrument goes off-hook, as indicated above, after the time delay determined by the R-C time constant, transistor Q1 will be turned on by the positive base voltage. Resistor R1 is provided to discharge capacitor C once a ringing signal has terminated.

Accordingly, transistor Q1 cannot be turned on by a ringing signal voltage. Diodes D1, D2 and D3 provide additional protection, because, on the average, the base of transistor Q1 is more negative than the emitter of transistor Q1 because point A attempts to charge to approximately 2.1 volts below the emitter potential during one half cycle of the ringing voltage and only to 1.4 volts above the emitter voltage during the other half cycle. On the average, the base of transistor Q1 is negative with respect to the emitter.

Typical components and component values for the exemplary circuit are as follows: Q1—MPS—A42; D1 to D5—1N4007; Rl, R2—220 ohms; C—330 uF.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A circuit for connection into a telephone line for detecting when a telephone instrument has gone off-hook and which is unaffected by the presence of a ringing signal on the telephone line comprising:
   switching means connected to the telephone line having a control input;
   first means coupled to the telephone line and the switching means for developing a first voltage thereacross when the telephone instrument has gone off-hook;
   means coupled to the first means for charging to the first voltage when the telephone instrument has gone off-hook after a time delay and for activating said switching means;
   second means coupled to the telephone line, the switching means and the first means for developing a second voltage thereacross during one half cycle of a ringing signal on the telephone line, said first means developing said first voltage during a second half cycle of the ringing signal, said first and second voltages being of opposite polarity, whereby said charging means alternately charges toward said first and second voltages during the ringing signal, said charging means having a time constant such that said charging means never charges to a voltage during a half cycle of said ringing signal sufficient to activate said switching means and on the average, said charging means maintains the control input of said switching means at a potential substantially intermediate said first and second voltages.

2. The circuit recited in claim 1 wherein:
   said first means comprises a first plurality of series connected diodes connected in series with the telephone line; and
   said second means comprises a plurality of series connected diodes comprising a second plurality greater than said first plurality connected in series with the telephone line in anti-parallel relationship to said first means.

3. The circuit recited in claim 2 wherein said charging means comprises a series circuit comprising a resistor and a capacitor connected in series across said first and second means, the control input of said switching means connected to a common connection point between said resistor and capacitor.

4. The circuit recited in claim 3 wherein said switching means comprises transistor means.

5. The circuit recited in claim 4 wherein said switching means comprises an output coupled to a control circuit.

6. The curcuit recited in claim 5 wherein said telephone line comprises a party line and said control curcuit comprises means for identifying the party using the telephone instrument.

* * * * *